(12) United States Patent
Thiam et al.

(10) Patent No.: US 7,979,649 B1
(45) Date of Patent: Jul. 12, 2011

(54) METHOD AND APPARATUS FOR IMPLEMENTING A STORAGE LIFECYCLE POLICY OF A SNAPSHOT IMAGE

(75) Inventors: Alioune Thiam, Hugo, MN (US); Deepak M. Patil, Roseville, MN (US); Dennis C. Parker, Burnsville, MN (US)

(73) Assignee: Symantec Corporation, Mountain View, CA (US)

( * ) Notice: Subject to any disclaimer, the term of this patent is extended or adjusted under 35 U.S.C. 154(b) by 491 days.

(21) Appl. No.: 12/135,717

(22) Filed: Jun. 9, 2008

(51) Int. Cl.
*G06F 12/00* (2006.01)

(52) U.S. Cl. ........................................ 711/161; 711/162

(58) Field of Classification Search ................ 711/162, 711/161
See application file for complete search history.

(56) References Cited

U.S. PATENT DOCUMENTS

| 7,069,401 B1 * | 6/2006 | Noonan et al. ............... 711/162 |
| 2009/0216796 A1 * | 8/2009 | Slik et al. .................. 707/103 R |

* cited by examiner

*Primary Examiner* — Mardochee Chery
(74) *Attorney, Agent, or Firm* — Campbell Stephenson LLP

(57) ABSTRACT

A method and apparatus for managing a lifecycle of a snapshot image using a storage lifecycle policy is described. In one embodiment, the method comprises recording a snapshot image of a volume and creating a copy of the snapshot image, wherein the copy is to be used to implement a storage lifecycle policy for the snapshot image.

17 Claims, 4 Drawing Sheets

METHOD AND APPARATUS FOR IMPLEMENTING A STORAGE LIFECYCLE POLICY OF A SNAPSHOT IMAGE

BACKGROUND OF THE INVENTION

1. Field of the Invention

Embodiments of the present invention generally relate to a data protection systems and, more particularly, to a method and apparatus for implementing a storage lifecycle policy of a snapshot image in order to facilitate end-to-end data protection.

2. Description of the Related Art

A typical enterprise (e.g., a small business, a government organization and/or large corporation) may accumulate a large amount of computer data. Employees and various entities use the computer data in order to perform one or more respective duties for the typical enterprise. If the computer data becomes corrupted, lost, damaged or otherwise unavailable, the performance of the one or more respective duties becomes impossible and/or delayed. Furthermore, overall productivity of the typical organization becomes significantly hindered. Moreover, customers pay the typical organization to use a portion of the computer data to perform various functions. Similarly, if the computer data became unavailable, the customers cannot complete the various functions and become frustrated. Accordingly, the typical organization loses actual and/or potential revenue streams due to the loss of the computer data.

Hence, the typical enterprise may implement a data storage backup and restore solution (e.g., VERITAS NetBackup) for recovering the computer data after an event where the computer data becomes unavailable (e.g., a disaster, a damaged disk, a corrupted file and/or the like). A storage administrator for the typical enterprise may configure a policy (e.g., a storage lifecycle policy) for managing one or more backup images (e.g., tape-based backup images). The policy may define a backup job or duplication job with a storage destination (e.g., a storage unit) and a retention period for the one or more backup images.

For example, the storage lifecycle policy may define a backup job where a portion of the computer data is backed up as a backup image copy and stored in a storage unit (e.g., a disk drive, a tape drive, a logical storage unit (LUN), a virtual tape library (VTL) and/or the like) with a retention period of three weeks. After the completion of three weeks, the storage lifecycle policy defines a duplication job where the backup image is duplicated to create another copy at a storage unit with a retention period of six months. The storage lifecycle policy may define one or more additional duplication jobs. Lastly, the storage lifecycle policy may define a job where the backup image is archived into a tape library or a disk array.

Conventional techniques for managing the backup image are limited to tape-based backup images. Hence, such conventional techniques cannot be used to manage snapshot images, such as a snapshot image of a volume. Generally, snapshots are point-in-time, volume-level disk images that are more stable, cheaper and faster than tape-based backup images with respect to data restoration. Furthermore, such conventional techniques do not provide the storage administrator with a continuous data protection solution.

Therefore, there is a need in the art for a method and apparatus for defining and implementing a storage lifecycle policy of a snapshot image in order to facilitate end-to-end data protection.

SUMMARY OF THE INVENTION

Embodiments of the present invention generally comprise a method and apparatus for implementing a storage lifecycle of a snapshot image. In one embodiment, the method for managing a lifecycle of a snapshot image using a storage lifecycle policy, comprises recording a snapshot image of a volume and creating a copy of the snapshot image, wherein the copy is to be used to implement a storage lifecycle policy for the snapshot image.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
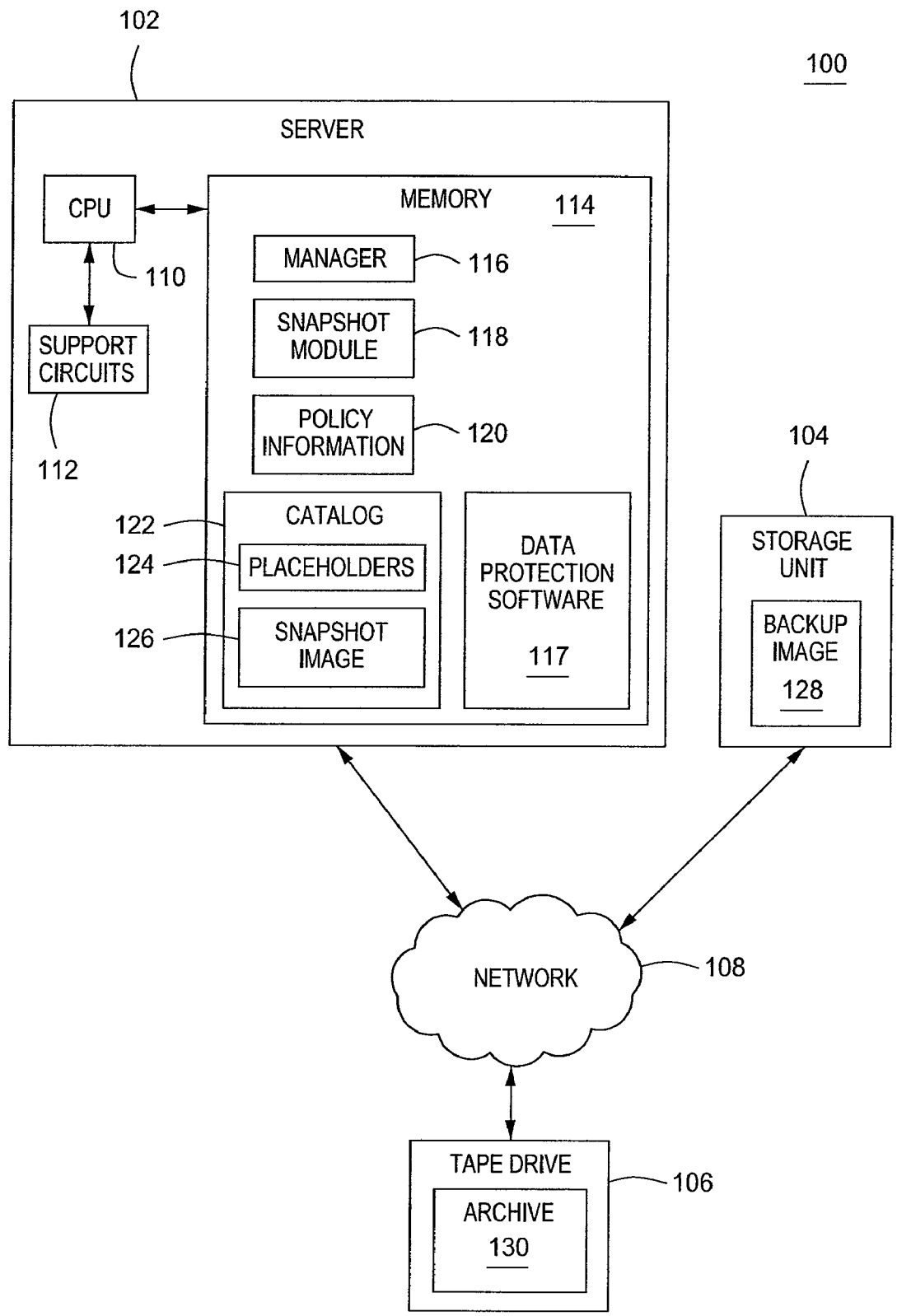
FIG. 1 is a block diagram of a system for managing a lifecycle of a snapshot image using a storage lifecycle policy according to one or more embodiments of the present invention.

FIG. 1 is a block diagram of a system 100 for managing a lifecycle of a snapshot image using a storage lifecycle policy according to one or more embodiments of the present invention. In one or more embodiments, the snapshot image is a snapshot image. The system 100 includes a master server 102, a storage unit 104 and a tape drive 106 in which each is coupled to each other through a network 108. It is appreciated that the system 100 may include one or more storage units that are similar to the storage unit 104 according to one or more embodiments of the present invention.

The server 102 is a computing device (e.g., a laptop, a desktop, a Personal Desk Assistant (PDA), a tablet, a mobile phone and the like) that comprises a central processing unit (CPU) 110, various support circuits 112 and a memory 114. The CPU 110 may comprise one or more commercially available microprocessors or microcontrollers that facilitate data processing and storage. The various support circuits 112 facilitate operation of the CPU 110 and may include clock circuits, buses, power supplies, input/output circuits and/or the like. The memory 114 includes a read only memory, random access memory, disk drive storage, optical storage, removable storage, and the like. The memory 114 includes various software packages, such as a manager 116, data protection software 117 and a snapshot module 118. The memory 114 further includes various data, such as policy information 120 and a catalog 122. The catalog 122 further includes a placeholder 124 and a snapshot image 126. It is appreciated that the catalog 122 may also include one or more placeholders and one or more snapshot images according to one or more embodiments of the present invention.

The storage unit 104 includes a portion of a computer data storage device, such as a hard disk drive, a Redundant Array of Inexpensive Disks (RAID)-5 disk array, a virtual tape library (VTL), a magnetic tape drive and/or the like. The storage unit 104 may include a file system directory on a disk or a tape that stores data (e.g., backup data, duplicated data and/or the like). In one embodiment, the storage unit 104 includes a backup image 128.

The tape drive 106 is a sequential device that includes magnetic tape as a storage medium for storing computer data. Hence, computer data is stored or archived onto the magnetic tape in sequential order. The tape drive further includes an archive 130. The archive 130 may include archive data from a client subsystem.

The network 108 comprises a communication system that connects computers by wire, cable, fiber optic, and/or wireless links facilitated by various types of well-known network elements, such as hubs, switches, routers, and the like. The network 108 may employ various well-known protocols to communicate information amongst the network resources. For example, the network 108 may be part of the Internet or intranet using various communications infrastructure such as Ethernet, WiFi, WiMax, General Packet Radio Service (GPRS), and the like. The network 108 may form a portion of a Storage Area Network (SAN) and/or a Local Area Network (LAN).

The manager 116 comprises software code for implementing a storage lifecycle policy that is associated with a backup policy (e.g., a schedule for creating snapshot images and/or backup images). For example, the backup policy may be a VERITAS NetBackUp Policy that defines a schedule for performing various data protection operations on the computer data, such as backup, duplication, restoration, snapshot and/or the like. Furthermore, the storage lifecycle policy may be a VERITAS NetBackUp Storage Lifecycle Policy that defines a strategy or plan for managing the progression (i.e., staging) of the computer data. In one embodiment, the storage lifecycle policy may indicate a data protection operation (e.g., duplication, backup, snapshot and/or the like) to be performed on the computer data, a storage destinations for the data protection operation and a retention period for the computer data at the storage destination.

The storage destination may be a storage unit, such as the storage unit 104 or any portion of computer data storage that is under the control of the server 102. The retention period may be a period of time in which the computer data is stored at the storage destination. Moreover, the retention period may be used to decide when a particular copy of the computer data (e.g., the backup image 128) at the storage destination is to be removed from the catalog 122. Copies for the snapshot image 126 and the backup image 128 may be created at the time of the backup operation. Whereas, an archive copy as well as any additional duplication copies are created subsequently in accordance with the storage lifecycle policy. It is appreciated that the storage lifecycle policy may also indicate a plurality of data protection operations to be performed consecutively for which the storage lifecycle policy indicates a plurality of storage destinations and a plurality of retention periods.

The manager 116 cooperates with the data protection software 117, the snapshot module 118 and the policy information 120 to control a lifecycle (i.e., staging) of a snapshot based backup. The data protection software 117 (e.g., VERITAS NetBackUp) comprises software code for implementing the backup policy and performing one or more data protection operations across an enterprise. The snapshot module 118 (e.g., Continuous Data Protection (CDP), LINUX and HP-UX logical volume managers and/or the like) comprises software code for generating a snapshot image of computer data, such as the snapshot image 126. Generally, the snapshot image 126 is a disk image that includes a point-in-time copy of the computer data (e.g., a volume). The policy information 120 comprises the storage lifecycle policy and/or the backup policy, as described above.

In one embodiment, the policy information 120 specifies the catalog 122 in the server 102 as a storage destination for the snapshot image 126. Generally, the catalog 122 includes information associated with the data protection software 117. For example, the catalog 122 may include a mapping between file system objects (e.g., files) of a volume and storage locations on a tape drive or a virtual tape library (VTL) to facilitate the recovery of the file system objects. Thus, the data protection software 117 uses the catalog 122 to locate and restore the file system objects from the tape drive or the virtual tape library (VTL) to the volume. Furthermore, the data protection software 117 updates the catalog 122 when the snapshot image 126 (i.e., a new snapshot image) or the backup image 128 (i.e., a new backup image) is created. As described further below, the data protection software 117 records or stores the snapshot image 126 in the catalog 122.

In operation, the manager 116 uses the data protection software 117 to perform one or more duplication or backup operations (e.g., jobs) on computer data (e.g., a volume) in accordance with the policy information 120. In one embodiment, the manager 116 may use the data protection software 117 to store the duplicated or backed up computer data (e.g., the backup image 128) in the storage unit 104. In one embodiment, the manager 116 performs a snapshot operation on the computer data and generates one or more snapshot images, such as the snapshot image 126, in accordance with the policy information 120. In another embodiment, the manager 116 may use the snapshot module 118 to generate the snapshot image 126 from the computer data.

The policy information 120 may include a schedule for controlling the generation of the one or more snapshot images. For example, the schedule may indicate that a snapshot image is generated once a day. In one embodiment, the manager 116 uses the policy information 120 to determine a storage destination for the snapshot image 126. As mentioned above, the policy information 120 comprises a storage lifecycle policy, which specifies the storage destination for the snapshot image 126. Accordingly, the manager 116 stores the snapshot image 126 in the specified storage destination.

In one embodiment, storage of the snapshot image 126 at a first storage destination may only constitute a portion of the storage lifecycle. Eventually, the snapshot image 126 is to be duplicated (e.g., automatically) to a second storage destination specified in the policy information 120 (e.g., the storage lifecycle policy) as a backup image, such as the backup image 128 (e.g., a NetBackUp image). In another embodiment, the snapshot image 126 may be stored at the first storage destination for a retention period defined in the policy information 120 before the snapshot image 126 is expired and/or removed from the catalog 122. In one embodiment, the backup image 128 includes a Tape Archive (TAR)-based file that is a copy of the snapshot image 126. The snapshot image 126 may be converted into a TAR-based file and stored as the backup image 128 on the storage unit 104. In yet another embodiment, the snapshot image 126 is frozen (i.e., copy-on-write operations stopped) and a backup operation is performed, which produces the backup image 128.

For example, a storage lifecycle policy may specify a first retention period of three days for the snapshot image 126 and a first storage destination as the server 102. Furthermore, the storage lifecycle policy may specify a second retention period of four months for a copy of the snapshot image 126 and a second storage destination as the storage unit 104. Moreover, the storage lifecycle policy may specify a third retention period of six years for an archive 130 that comprises archived computer data from the snapshot image 126. After the snapshot image 126 is created, the snapshot image 126 is duplicated automatically at the storage unit 104 to create the backup image 128 (e.g., a TAR-based copy) and/or archived into the archive 130. After three days, the snapshot image 126 may be removed or expired. After four months, the backup image 128 may be removed or expired for the snapshot image 126. After six years, the archive 130 may be removed or expired for the snapshot image 126.

According to another embodiment, the backup image 128 is generated as a result of a full backup operation on computer data (e.g., a volume). In this embodiment, the backup image 128, the snapshot image 126 and/or any combination thereof may be duplicated or copied to a storage destination defined by the storage lifecycle policy. The backup policy may define a schedule where a snapshot and a full backup are performed on the computer data on a weekly basis. Furthermore, the snapshot operation precedes the full backup operation. Consequently, the snapshot image 126 and the backup image 128 may not be exact copies because the full backup operation takes longer to complete than the snapshot operation and the computer data may change during that time. Alternatively, the backup policy may define a schedule where only snapshot images of the computer data are generated. As described above, such snapshot images are converted into backup images (e.g., NetBackUp images) and stored on another storage unit. These backup images are to be used as input for the manager 116 while implementing the storage lifecycle policy.

In one embodiment, the policy information 120 specifies a portion of the catalog 122 as a snapshot storage destination for the snapshot image 126. For example, the manager 116 instructs the data protection software 117 to store the snapshot image 126 in the catalog 122 for a retention period of three days in accordance with a storage lifecycle policy. By cataloging the snapshot image 126, the snapshot image 126 may be used as input for various operations, such as restore and listing operations.

As described above, the policy information 120 may also specify a storage destination for a TAR-based copy of the snapshot. In one embodiment, the snapshot image 126 may be duplicated to the storage unit 104 automatically after the snapshot image 126 is stored in the catalog 122. After the three days elapses, the manager 116 instructs the data protection software 117 to expire and remove the snapshot image 126 from the catalog 122 according to another embodiment. The TAR-based copy may be stored as the backup image 128 for a retention period of four weeks. Furthermore, the TAR-based copy may be used as input for one or more data protection operations that are performed in accordance with the policy information 120. The backup image 128 may be used to archive the snapshot image 126 into the archive 130 for a retention period of six years. Hence, the snapshot image 126, the backup image 128 and the archive 130 are to be expired and removed from the catalog 122 after the retention periods of three days, four months and six years elapse, respectively.

The catalog 122 further includes the placeholder 124. In one embodiment, the manager 116 creates the placeholder 124 for the snapshot image 126. The placeholder 124 may be stored in the catalog 122 (e.g., in a same storage location as the snapshot image 126). The placeholder 124 indicates that the backup image 128 (e.g., TAR-based copy of the snapshot image 126) is to be used as input for any data protection operation specified by the policy information 120. The placeholder 124 also permits a storage administrator to view various locations of the computer data from a single place.

In one embodiment, the server 102 is a VERITAS NetBackUp master server. A user interface for the master server may be used by the storage administrator to define and/or modify the policy information 120. In one embodiment, the storage administrator may define one or more retention periods and/or one or more storage destination as well as a number of data protection operations for a NetBackUp storage lifecycle policy through the manager 116. In another embodiment, the storage administrator may configure a backup policy that creates a first copy of the computer data to be protected using the snapshot module 118. Such a first copy may be controlled by the manager 116 and/or the data protection software 117 in a manner that is similar to a copy of a non-snapshot, backup image.

As an example of a use or an application of various embodiments of the present invention, a storage lifecycle policy is created by a storage administrator using the data protection software 117. In addition, the storage administrator defines one or more data protection operations for the storage lifecycle policy. A backup policy is associated with the storage lifecycle policy. One or more snapshot images and/or one or more backup images are created during implementation of the storage lifecycle policy. After a disaster that causes a loss of the computer data, a particular snapshot image of the one or more snapshot images or a particular backup image of the one or more backup images may be used to recover the lost computer data.

Figure 2:
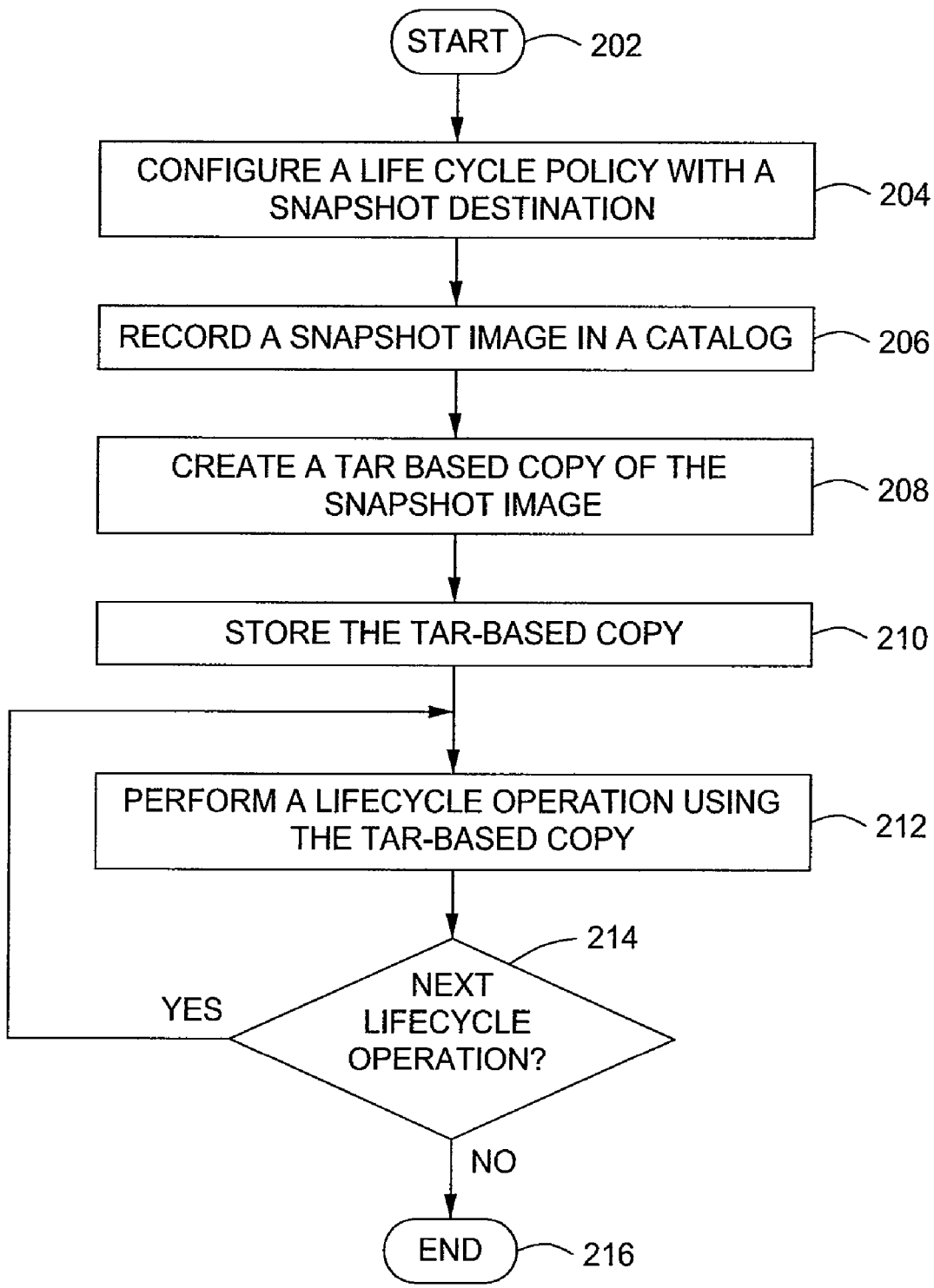
FIG. 2 is a flow diagram of a method for duplicating a snapshot image according to one or more embodiments of the present invention.

FIG. 2 is a flow diagram of a method 200 for duplicating a snapshot image according to one or more embodiments of the present invention. The method 200 begins at step 202 and proceeds to step 204.

At step 204, a storage lifecycle policy is configured with a snapshot destination. At step 206, a snapshot image is recorded in a catalog. At step 208, a TAR-based copy of the snapshot image is created. At step 210, the TAR-based copy is stored. In one embodiment, a snapshot image is duplicated to a storage unit as soon as the snapshot image is generated. At step 212, a storage lifecycle operation is performed using the TAR-based copy. At step 214, a determination is made as to whether there is a next storage lifecycle operation. If there are no more storage lifecycle operations, the method 200 proceeds to step 216. If there is a next storage lifecycle operation, the method 200 returns to step 212. At step 216, the method 200 ends.

Figure 3:
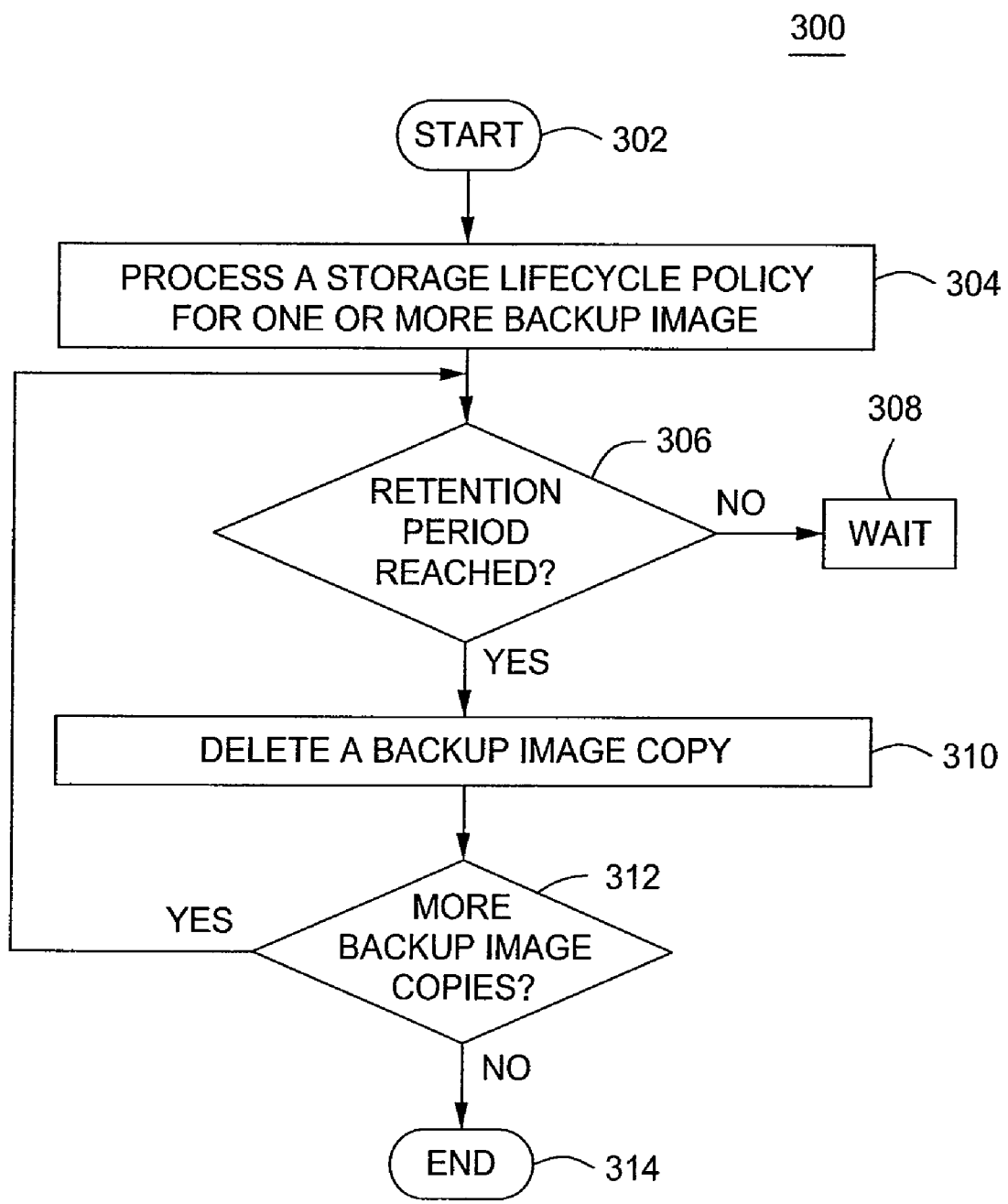
FIG. 3 is a flow diagram of a method for implementing a storage lifecycle policy for a snapshot image according to one or more embodiments.

FIG. 3 is a flow diagram of a method 300 for implementing a storage lifecycle policy for a snapshot image according to one or more embodiments. The method 300 begins at step 302 and proceeds to step 304. At step 304, a storage lifecycle policy for one or more backup images is processed.

At step 306, a determination is made as to whether the retention period has been reached. If it is determined that the retention period has been reached, the method 300 proceeds to step 310. If it is determined that the retention period has not been reached, the method 300 proceeds to step 308. At step 308, the method 300 waits. At step 310, a backup image copy is deleted. In one embodiment, the backup image copy comprises a TAR-based copy of the snapshot image. At step 312, a determination is made as to whether there are more backup image copies. If it is determined that there are no more backup images copies, the method 300 proceeds to step 314. If it is determined that there are more backup image copies, the method 300 returns to step 306. At step 314, the method 300 ends.

Figure 4:
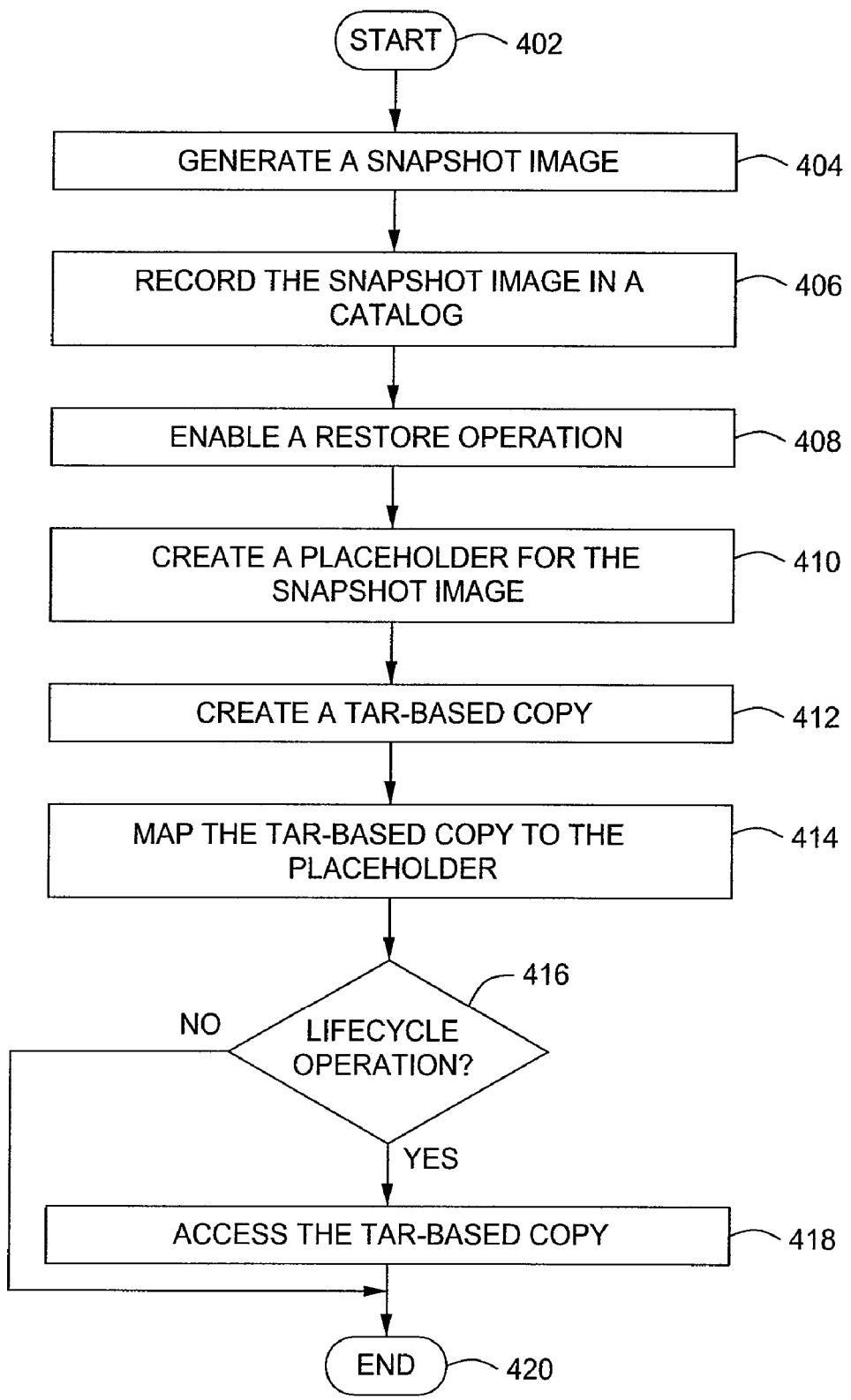
FIG. 4 is a flow diagram of a method for implementing a storage lifecycle policy for a snapshot image using a placeholder according to one or more embodiments.

FIG. 4 is a flow diagram of a method 400 for implementing a storage lifecycle policy for a snapshot image using a placeholder according to one or more embodiments. As described above, the placeholder enables a storage administrator to view the various locations of computer data from a single place. The method 300 begins at step 402 and proceeds to step 404. At step 404, a snapshot image is generated.

At step 406, the snapshot image is recorded. In one embodiment, the snapshot image is recorded in a catalog (e.g., the catalog 122 of FIG. 1). At step 408, a restore operation for the snapshot image is enabled. At step 410, a placeholder for the snapshot image is created. At step 412, a TAR-based copy of the snapshot image is created. At step 414, the TAR-based copy is mapped to the placeholder.

At step 416, a determination is made as to whether there is a lifecycle operation to be performed. If it is determined that there is a storage lifecycle operation to be performed, the method 400 proceeds to step 418. If it is determined that there is no storage lifecycle operation to be performed, the method 400 proceeds to step 420. At step 418, the TAR-based copy is accessed through the placeholder. The TAR-based copy is to be used as input for the storage lifecycle operation. At step 420, the method 400 ends.

While the foregoing is directed to embodiments of the present invention, other and further embodiments of the invention may be devised without departing from the basic scope thereof, and the scope thereof is determined by the claims that follow.

The invention claimed is:

1. A method for managing a lifecycle of a snapshot image using a storage lifecycle policy, comprising:
   recording a snapshot image of a volume, wherein the snapshot image is recorded in a catalog in memory of a server;
   creating a placeholder in the catalog, wherein the placeholder is associated with the snapshot image recorded in the catalog;
   creating a TAR-based copy of the snapshot image, wherein the copy is to be used to implement a storage lifecycle policy for the snapshot image;
   mapping the TAR-based copy to the placeholder;
   determining that a lifecycle operation is to be performed;
   in response to the determining, accessing the TAR-based copy that mapped to the placeholder;
   using the TAR-based copy as input to the lifecycle operation.

2. The method of claim 1, wherein recording the snapshot image further comprises configuring the storage lifecycle policy with a storage destination for the snapshot image.

3. The method of claim 1, wherein creating the copy of the snapshot image further comprises converting the snapshot image into a backup image for storage in memory external to the server.

4. The method of claim 1, wherein creating the copy of the snapshot image further comprising:
   freezing the snapshot image; and
   performing a backup operation of the frozen snapshot image to generate a backup image.

5. The method of claim 1 further comprising deleting the snapshot image in response to an expiration of a retention period for the snapshot image.

6. The method of claim 1 further comprising archiving the copy of the snapshot image.

7. The method of claim 1 further comprising duplicating the copy of the snapshot image to at least one storage unit in accordance with the storage lifecycle policy.

8. The method of claim 1 further comprising:
   identifying a data protection operation to be performed on the copy of the snapshot image;
   determining a storage destination associated with the data protection operation; and
   duplicating the copy of the snapshot image to the storage destination.

9. The method of claim 8 further comprising:
   establishing an expiration of a retention period for the copy of the snapshot image; and
   deleting the copy of the snapshot image.

10. A computer readable medium comprising executable instructions, wherein a method is implemented in response to executing the instructions, the method comprising:
    recording a snapshot image of a volume, wherein the snapshot image is recorded in a catalog in memory of a server;
    creating a placeholder in the catalog, wherein the placeholder is associated with the snapshot image recorded in the catalog;
    creating a TAR-based copy of the snapshot image, wherein the copy is to be used to implement a storage lifecycle policy for the snapshot image;
    mapping the TAR-based copy to the placeholder;
    determining that a lifecycle operation is to be performed;
    in response to the determining, accessing the TAR-based copy that mapped to the placeholder;
    using the TAR-based copy as input to the lifecycle operation.

11. The computer readable medium of claim 10, wherein recording the snapshot image further comprises configuring the storage lifecycle policy with a storage destination for the snapshot image.

12. The computer readable medium of claim 10, wherein creating the copy of the snapshot image further comprises converting the snapshot image into a backup image for storage in memory external to the server.

13. The computer readable medium of claim 10, wherein creating the copy of the snapshot image further comprises:
    freezing the snapshot image; and
    performing a backup operation of the frozen snapshot image to generate a backup image.

14. The computer readable medium of claim 10 wherein the method further comprises deleting the snapshot image in response to an expiration of a retention period for the snapshot image.

15. The computer readable medium of claim 10 wherein the method further comprises archiving the copy of the snapshot image.

16. The computer readable medium of claim 10 wherein the method further comprises duplicating the copy of the snapshot image to at least one storage unit in accordance with the storage lifecycle policy.

17. The computer readable medium of claim 10 wherein the method further comprises:
    identifying a data protection operation to be performed on the copy of the snapshot image;
    determining a storage destination associated with the data protection operation; and
    duplicating the copy of the snapshot image to the storage destination.

* * * * *